United States Patent [19]

de Lasa et al.

[11] Patent Number: 5,424,262

[45] Date of Patent: Jun. 13, 1995

[54] FLUIDIZED CRACKING CATALYST WITH IN SITU METAL TRAPS

[75] Inventors: Hugo I. de Lasa, London, Canada; Hany I. Farag, Trodenheim, Norway; Siauw Ng, Nepean, Canada

[73] Assignee: Energy, Mines and Resources Canada, Ottawa, Canada

[21] Appl. No.: 202,089

[22] Filed: Feb. 25, 1994

[51] Int. Cl.$^6$ .......................................... B01J 29/076
[52] U.S. Cl. .......................................... 502/64; 502/79
[58] Field of Search ................................. 502/64, 79

[56] References Cited

U.S. PATENT DOCUMENTS

| | | | |
|---|---|---|---|
| 3,711,422 | 1/1973 | Johnson et al. | 252/414 |
| 4,025,458 | 5/1977 | McKay | 252/416 |
| 4,083,807 | 4/1978 | McKinney et al. | 252/455 |
| 4,111,845 | 9/1978 | McKay | 252/455 Z |
| 4,169,784 | 10/1979 | Nielsen et al. | 208/113 |
| 4,255,287 | 3/1981 | Bertus er al. | 252/455 Z |
| 4,489,169 | 12/1984 | Bertus et al. | 502/64 |

Primary Examiner—Wayne Langel
Assistant Examiner—Thomas G. Dunn, Jr.

[57] ABSTRACT

A method is described for making a fluidized cracking catalyst having in situ highly dispersed metal traps which comprises (a) impregnating particles of a zeolite catalyst by the incipient wetness technique under sub-atmospheric conditions with a mixture of a tin compound and an antimony compound dissolved in an organic solvent, (b) stirring the impregnated catalyst in paste form while still under sub-atmospheric conditions, (c) heating the mixed catalyst in the presence of an oxygen-containing gas until dry, and repeating shops (a), (b) and (c) above until a desired level of said metals in the metal traps is achieved. In the incipient wetness technique, an appropriate amount of solvent is added to achieve proper transport of organometallic components, precursors of the metal traps, providing at the same time complete wetness of a given amount of catalyst without forming a layer of liquid on top of the catalyst. The impregnation procedure is usually repeated at least four times to obtain the desired metal loading.

11 Claims, 1 Drawing Sheet

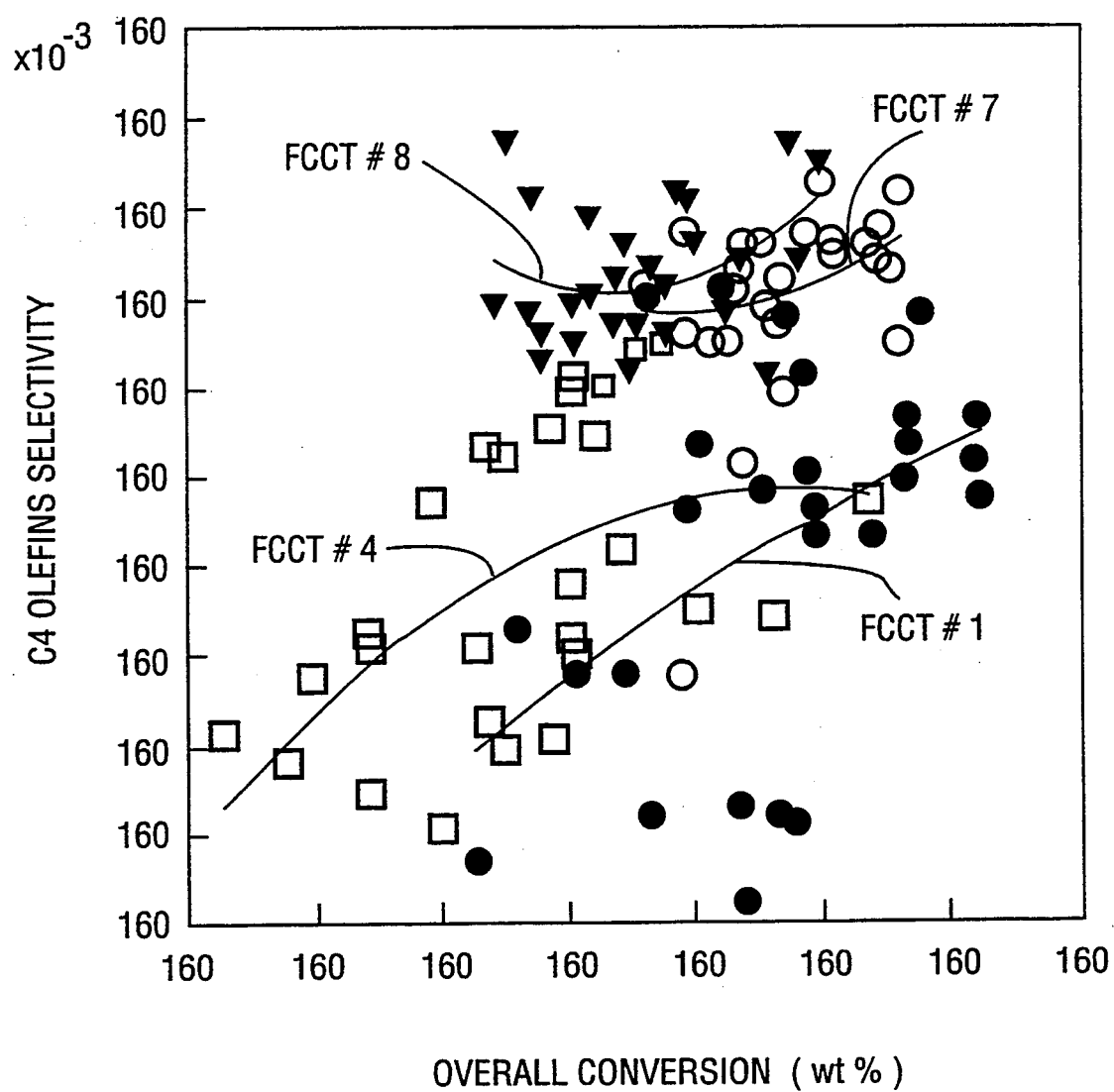

FLUIDIZED CRACKING CATALYST WITH IN SITU METAL TRAPS

TECHNICAL FIELD OF THE INVENTION

This invention relates to an improved cracking catalyst for the catalytic cracking of hydrocarbon feedstock and, more particularly, an improved method for adding metal traps containing tin and antimony as passivators.

BACKGROUND OF THE INVENTION

As the reserves of conventional crude oils decline, there is an increasing demand for oil refineries to process moral contaminated heavy crude oil and residuum feedstocks. The cracking of these heavier fractions introduces numerous problems for refineries, as well as for catalyst manufacturers. For instance, these heavy hydrocarbon fractions frequently contain excessive quantities of organometallic contaminants which tend to be extremely detrimental to various catalytic processes that may be carried out during refining. Of the metallic contaminants, those containing nickel and vanadium are most common, although other metals such as iron are often present. These heavy fractions also have a high CCR(Conradson Carbon Residue).

Nickel and vanadium found in residual oils are in the form of complexes of porphyrin-like structures. The metals deposit almost quantitatively on the catalyst surface and act as dehydrogenating catalyst to produce excessive coke build-up and hydrogen formation in a catalytic cracker. These metal contaminants, particularly vanadium, have a deactivation effect over the catalyst. While there are potential advanced mechanisms for explaining such a deactivation by vanadium an irreversible destruction of the zoolite crystallinity of the catalyst. However, not only catalyst activity is affected, nickel tends to influence selectivity promoting dehydrogenation reactions leading to the formation of more hydrogen and coke. Excessive coke formation may upset the heat balance of the catalytic cracking unit and lead to metallurgical problems in the catalyst regenerator. Furthermore, the light gases that are produced may overload compressors associated with a fluid catalytic cracking unit.

For many years researchers have been looking for ways to mitigate the detrimental effects of nickel and vanadium. One technique has been to use a metal scavenger which reacts with the metal contaminants before the contaminants can react with the catalyst. In other words, a large dumping area is provided on the catalyst to accommodate the accumulating metals, and preferably separate the cracking function of the zeolite from the one of metal sink. In order to achieve this, it has been suggested to use a two range particle size with larger particles (180-100 $\mu$m) which contain zeolite components with the cracking activity and smaller particles (30-60 $\mu$m) with a matrix of kaolin and amorphous silica-alumina, and possibly other additives for minimizing $SO_x$ emissions and/or catalyzing oxidation.

Other suggestions include the use of basic alkaline earth oxides, such as MgO or CaO, to passivate vanadium by scavenging $V_2O_5$ before it destroys the zeolite. Other proposed metal scavengers include magnesium silicates (sepiolite) and metakaolin microspheres.

Much research work has also been conducted and numerous patents have issued over the past twenty years on loading the catalyst with passivators. For instance, it has been known for many years that antimony compounds are effective passivators against the poisoning effect of nickel on cracking catalysts and that tin compounds are effective against the contaminating effects of vanadium.

For instance, Johnson et al U.S. Pat. No. 3,711,422 issued Jan. 16, 1973, describes the addition of an antimony compound to fresh catalysts or nickel and vanadium contaminated catalysts. The patent describes a variety of ways of incorporating the antimony compound, including incorporation in the feedstock, impregnating from aqueous solution, impregnating from non-aqueous solution and dry admixing.

Bertus et at U.S. Pat. No. 4,489,169 issued Dec. 18, 1984, describes a cracking catalyst which contains both antimony and tin compounds. The inventors describe a number of different ways of adding the antimony and tin compounds to the catalyst and state that the manner in which the conventional cracking catalyst is contacted with the antimony and tin modifying or treating agents is not critical.

It is the object of the present invention to provide a new and improved method of adding antimony and tin compounds to conventional cracking catalyst so as to achieve improved passivation.

SUMMARY OF THE INVENTION

According to the present invention particles of a conventional cracking catalyst are impregnated with a mixture of a tin compound and an antimony compound dissolved in an organic solvent. It is essential according to this invention that the impregnation be carried out by means of the incipient wetness technique under subatmospheric conditions. This means that an appropriate amount of solvent is added to allow effective dispersion of the antimony and tin compounds and to achieve complete wetness of a given amount of catalyst without forming a layer of liquid on top of the catalyst.

After the impregnation step, the impregnated catalyst is stirred in paste form while still under subatmospheric conditions. The mixed catalyst is thereafter heated in the presence of an oxygen-containing gas until dry.

It is also essential according to the present invention that the steps of (a) impregnating, (b) stirring in paste form and (c) heating until dry be repeated two or more times and preferably at least four times to achieve the final desired uniform loading of antimony and tin on the catalyst.

It has been found that the special loading procedure of this invention with the incipient wetness technique and multiple impregnation is essential in order to allow the metal trap organometallic compounds to properly diffuse on the catalyst matrix, achieving in this way high dispersion and intimacy of contact between the metal traps material and the zeolite matrix.

The particular metal trap loading technique of the present invention has been found to have a number of significant advantages as follows:
1. Substantial increase in gasoline production;
2. Reduction in coke formation and hydrogen yields;
3. No new capital investment is required to process increased amounts of highly Ni and V contaminated feedstock;
4. Increased conversion of gas oil is possible.

The metal loading technique of the present invention can be applied to any conventional cracking catalyst. Such cracking catalyst materials can be any of those conventionally employed in the catalytically cracking of hydrocarbons boiling above about 400° F. for the production of gasoline, motor fuel, blending components, light distillates, etc. These conventional cracking catalysts generally contain silica or silica-alumina and are frequently associated with zeolitic materials. It is particularly applicable to synthetic zeolite catalysts, such as rare earth exchanged zeolite X or Y and the zeolite ZSM catalysts.

The catalysts used in the fluid catalytic cracking (FCC) process typically have a particle size range of about 20–300 μm, containing about 10–40 wt % zeolites, and can vary in pore volume and surface area. Generally, however, the catalysts will have a pore volume in the range of about 0.1 to about 1 ml/g. The surface area of the catalyst material will generally be in the range of about 50 to about 500 m²/g.

It is important that the antimony and tin compounds be mixed together before they are used to impregnate the catalyst particles by the incipient wetness technique. The antimony and tin compounds are typically mixed in a ratio within the range of about 10:1 to about 0.5:1, preferably in the range of 2.2:1 to 1.5:1, by weight. For instance, the antimony compound is preferably added in an amount of 1,000–4,000 ppm and the tin compound is preferably added in an amount of 100–4,000 ppm. For optimum results, antimony levels of at least 2,000 ppm and tin levels of about 900–1,000 ppm are particularly preferred.

The precursor form in which the antimony and tin compounds are dispersed in the catalyst as a preliminary step for metal trap formation is not too critical. Thus, in principle antimony and/or tin compounds that provides passivation can be utilized. This includes elemental antimony, inorganic antimony compounds and organic antimony compounds as well as mixtures of these. Many such antimony compounds can be found in the literature, e.g. those listed in U.S. Pat. No. 4,489,169, incorporated herein by reference. Antimony compounds of particular interest include antimony O-O dialkylphosphoro-dithioate, antimony di-n-propyl phosphorothioate, antimony tris-O-O-dipropylphosphorothioate and antimony tris-O-O-dipropyldithiophosphate.

Likewise, any tin compound which promotes the passivation effects of antimony can be employed. These may include elemental tin, inorganic tin compounds and organic tin compounds as well as mixtures of these. Many different tin compounds are known in the literature and a large list of these can be found in U.S. Pat. No. 4,489,169, incorporated herein by reference. Particularly preferred tin compounds include stannous dihydroxycarbylphosphorodithioates, stannous di-n-propylphorodithioates, hexabutyltin and tetrabutyltin.

The antimony/tin-containing catalyst of the present invention is prepared by contacting the conventional catalytic cracking material with an admixture comprising the antimony compound and the tin compound dissolved in an organic solvent which will readily volatilize when the impregnated catalyst is heated. A convenient solvent for this purpose has been found to be benzene but a number of other organic solvents of either the aromatic, paraffinic and naphthenic family of compounds or combinations of those may be used. The impregnating is carried out by mixing the catalyst particles with the mixture of antimony and tin compounds dissolved in the organic solvent in a closed vessel under subatmospheric conditions. These subatmospheric conditions are typically in the range of about 200 to about 250 mmHg. The catalyst particles and metal compounds dissolved in organic solvent are mixed while still under the subatmospheric conditions, with the catalyst during the mixing being in paste form. This mixing is typically continued for a period of about 15 to 30 minutes. After mixing is completed, the catalyst paste is left to mature for a substantial period of time, e.g. in the order of 2 hours, so that eventual concentration gradients in the catalyst are minimized through interdiffusion of the organometallic compounds. Then the catalyst paste is heated in the presence of an oxygen containing gas, e.g. air, at an elevated temperature, e.g. within the range of about 425° C. to about 800° C., preferably about 670° C. for a period of at least about 2 hours. During this treatment, organometallic compounds are combusted and the catalyst recovers its original colour and free-flowing state. The above sequence of steps is repeated at least two times and preferably at least four times until the desired level of the metals in the metal, traps is achieved.

BRIEF DESCRIPTION OF THE DRAWINGS

FIG. 1 is a plot of $C_4$ olefins selectivity v. conversion.

DESCRIPTION OF THE PREFERRED EMBODIMENTS

The invention will be still more fully understood from the following examples, which are intended to illustrate preferred embodiments of the invention but not limit the scope thereof.

EXAMPLE 1

A commercial zeolite cracking catalyst available under the trade mark SUPER NOVA-D was employed in a series of tests which demonstrate the effectiveness of the present invention. Properties of this catalyst are shown in Table 1 below:

TABLE I

| | |
|---|---|
| $Al_2O_3$ (wt %) | 45 |
| Na (wt %) | 0.25 |
| REO (wt %) | 2.5 |
| Bulk Density (gr/cm³) | 0.75 |
| Surface Area (m²/gr) | |
| Before Steaming | 271 |
| After Steaming | 194 |
| Unit Cell Size (A°) | |
| Before Steaming | 24.53 |
| After Steaming | 24.32 |

A fresh steamed catalyst was brought to equilibrium conditions after steaming at 766° C., 1 atmosphere, using 100% steam for 18 hours. This catalyst was then introduced into a laboratory quartz container with a side opening for a vacuum line and a vacuum of about 250 mmHg was applied. A mixture of benzene solvent together with antimony di-n-propylphosphorodithioate available under the trade mark VANLUBE 622 and tetrabutyltin available under the trade mark ALCHEM 5004 was then added to the catalyst bed. The amount of benzene required to achieve the incipient wetness technique was previously determined without the presence of the metal and it was found that the ratio of benzene to catalyst should be about 3 ml of benzene for each 4 g of SUPER NOVA-D.

The catalyst was thoroughly mixed while still under vacuum for a period of about 30 minutes, with the catalyst in a paste form, dark in colour. After mixing, the paste was permitted to stand for 2 hours to minimize concentration gradients. Next, the catalyst paste was heated for two hours at 675° C. in the presence of air and during this heating step the catalyst recovered its original colour and its original physical state in the form of free flowing particles. The catalyst was then ready for the next impregnation step which was an exact duplication of the previous one, including the mixing and drying. The procedure was repeated four times to provide a total loading of desired amounts of antimony.

Three different catalyst were prepared, one containing antimony only, one containing both antimony and tin and a third one containing no metal traps. They were as follows:

FCCT #1 - 2,100 ppm antimony
FCCT #8 - 2,100 ppm antimony+940 ppm tin
FCC #3 - no metal traps.

In order to test the efficiency of the metal trap dispersion of antimony and tin, the catalyst was next impregnated with nickel and vanadium compounds also using the above described incipient wetness technique together with the application of vacuum and carried out in several stages. This allowed to similate conditions of very high Ni and V levels and consequently worst possible scenarios that a catalyst with metal traps could face in a catalytic cracking process.

The total amount of nickel and vanadium deposited was 3,000 ppm of nickel and 4,500 ppm of vanadium, and the technique assured that all nickel and vanadium present on the catalyst were in the active form. In industrial catalytic cracking units, about 30% of the metal is in an inactive form, having been deactivated by natural passivation which occurs during catalyst regeneration.

Using a laboratory catalytic cracking unit known as a "Pulse Micro-reactor" a series of tests were carried out utilizing the catalyst of the present invention as prepared above. These tests were conducted using as feedstock a synthetic crude oil having the properties shown in Table 2 below and designated hereinafter as "SF-164".

TABLE 2

| Specific Gravity | 0.9389 |
| Aniline Point (°C.) | 59 |
| Conradson carbon (wt %) | 0.15 |
| Ni (ppm) | 0.006 |

TABLE 2-continued

| V (ppm) | <0.005 |
| Volumetric Average Boiling point (°C.) | 393 |
| Simulated distillation (°C.) | |
| IBP | 261 |
| 5 wt % | 300 |
| 10 wt % | 322 |
| 30 wt % | 357 |
| 50 wt % | 387 |
| 70 wt % | 423 |
| 90 wt % | 474 |
| 95 wt % | 498 |
| FBP | 544 |
| Paraffins (wt %) | 7.4 |
| Molecular weight | 313 |
| Naphthalenes (wt %) | 40.9 |
| Molecular weight | 305 |
| Aromatics (wt %) | 51.7 |
| Molecular weight | 358 |

The catalytic cracking step was carried out at a temperature of 510°–550° C. and a total pressure in the reactor between 2.6 and 2.8 atm.

In order to obtain comparisons, tests were conducted with antimony alone, antimony and tin together and with no metal traps. The results are shown in Tables 3 to 8 below. In these, Tables 3 and 4 show the results obtained using a catalyst impregnated with antimony as metal trap at two temperature levels, Tables 5 and 6 show results obtained using a catalyst impregnated with antimony and tin and Tables 7 and 8 show results obtained with a catalyst which does not contain any metal traps. All three catalysts were impregnated with the same levels of nickel and vanadium (3,000 ppm of nickel and 4,500 ppm of vanadium).

During each run the catalyst was subject to a sequence of ten consecutive injections and only three of them (Injection #2, 6 and 10) were analyzed using GC analysis. During the earlier injections (e.g. Injection #2) the catalyst was essentially free of coke while for the later injections (e.g. Injection #10) the catalyst had a significant coke level. This made it possible to test the performance of the metal traps dispersed on FCC catalyst with catalyst having increasing levels of coke and consequently decreasing levels of catalytic activity.

TABLE #3

Summary of yields and conversions for the cracking of the synthethic crude SF-164, with FCCT #1 (Super Nova-D impregnated with 2100 ppm Sb, 3000 ppm Ni and 4500 ppm V).

| | Run # | | | | | | | | |
|---|---|---|---|---|---|---|---|---|---|
| | 06 A | | | 07 A | | | 08 E | | |
| | Conditions | | | | | | | | |
| | 120 ml/min/510° C. | | | 135 ml/min/510° C. | | | 150 ml/min/510° C. | | |
| | Injection # | | | | | | | | |
| | 2 | 6 | 10 | 2 | 6 | 10 | 2 | 6 | 10 |
| Light Gases (C$_1$–C$_4$) | 18.2 | 18.3 | 22.2 | 16.4 | 15.8 | 14.1 | 15.4 | 15.5 | 15.8 |
| Gasoline (C$_5$–C$_{12}$) | 40.9 | 34.4 | 33.1 | 41.0 | 40.4 | 36.9 | 31.5 | 29.9 | 27.3 |
| Light Cycle oil (C$_{13}$–C$_{20}$) | 16.4 | 12.2 | 10.6 | 13.7 | 16.8 | 13.0 | 9.5 | 8.6 | 7.6 |
| Heavy Cycle oil (>C$_{20}$) | 17.5 | 28.1 | 27.1 | 23.1 | 21.2 | 30.2 | 38.0 | 40.4 | 43.7 |
| Coke | 7.0 | 7.0 | 7.0 | 5.8 | 5.8 | 5.8 | 5.6 | 5.6 | 5.6 |
| Conversion* | 66.1 | 59.7 | 62.2 | 63.2 | 62.0 | 56.8 | 52.5 | 51.0 | 48.7 |
| Gasoline | 0.62 | 0.58 | 0.53 | 0.65 | 0.65 | 0.65 | 0.60 | 0.59 | 0.56 |

TABLE #3-continued

Summary of yields and conversions for the cracking of the synthethic crude SF-164, with FCCT #1 (Super Nova-D impregnated with 2100 ppm Sb, 3000 ppm Ni and 4500 ppm V).

| | Run # | | | | | | | | |
|---|---|---|---|---|---|---|---|---|---|
| | 06 A | | | 07 A | | | 08 E | | |
| | Conditions | | | | | | | | |
| | 120 ml/min/510° C. | | | 135 ml/min/510° C. | | | 150 ml/min/510° C. | | |
| | Injection # | | | | | | | | |
| | 2 | 6 | 10 | 2 | 6 | 10 | 2 | 6 | 10 |
| Selectivity** | | | | | | | | | |

All values are in weight percentage.
The light and heavy cycle oil fractions constitute the unconverted gas oil.
*Conversion = Light gases + Gasoline + Coke.
**Selectivity to Gasoline = wt % Gasoline / wt % Conversion.

TABLE #4

Summary of yields and conversions for the cracking of the synthethic crude SF-164, with FCCT #1 (Super Nova-D impregnated with 2100 ppm Sb, 3000 ppm Ni and 4500 ppm V).

| | Run # | | | | | | | | |
|---|---|---|---|---|---|---|---|---|---|
| | 09 B | | | 10 B | | | 11 A | | |
| | Conditions | | | | | | | | |
| | 120 ml/min/550° C. | | | 135 ml/min/550° C. | | | 150 ml/min/550° C. | | |
| | Injection # | | | | | | | | |
| | 2 | 6 | 10 | 2 | 6 | 10 | 2 | 6 | 10 |
| Light Gases ($C_1$-$C_4$) | 18.4 | 15.7 | 16.3 | 17.7 | 18.7 | 19.3 | 17.3 | 15.9 | 18.0 |
| Gasoline ($C_5$-$C_{12}$) | 38.6 | 32.5 | 30.7 | 37.7 | 36.1 | 32.8 | 37.1 | 35.5 | 32.1 |
| Light Cycle oil ($C_{13}$-$C_{20}$) | 10.5 | 9.1 | 8.5 | 12.6 | 12.6 | 10.2 | 12.9 | 12.8 | 10.1 |
| Heavy Cycle oil ($>C_{20}$) | 23.9 | 34.1 | 35.9 | 25.3 | 25.9 | 31.0 | 26.1 | 29.2 | 33.2 |
| Coke | 8.6 | 8.6 | 8.6 | 6.7 | 6.7 | 6.7 | 6.6 | 6.6 | 6.6 |
| Conversion* | 65.6 | 56.8 | 55.6 | 62.1 | 61.5 | 58.8 | 61.0 | 58.00 | 56.7 |
| Gasoline Selectivity** | 0.59 | 0.57 | 0.55 | 0.61 | 0.59 | 0.56 | 0.61 | 0.61 | 0.57 |

All values are in weight percentage.
The light and heavy cycle oil fractions constitute the unconverted gas oil.
*Conversion = Light gases + Gasoline + Coke.
**Selectivity to Gasoline = wt % Gasoline / wt % Conversion.

TABLE #5

Summary of yields and conversions for the cracking of the synthethic crude SF-164, with FCCT #8 (Super Nova-D impregnated with 2100 ppm Sb, 940 ppm Sn, 3000 ppm Ni and 4500 ppm V).

| | Run # | | | | | | | | |
|---|---|---|---|---|---|---|---|---|---|
| | 63 A | | | 64 A | | | 65 A | | |
| | Conditions | | | | | | | | |
| | 120 ml/min/510° C. | | | 135 ml/min/510° C. | | | 150 ml/min/510° C. | | |
| | Injection # | | | | | | | | |
| | 2 | 6 | 10 | 2 | 6 | 10 | 2 | 6 | 10 |
| Light Gases ($C_1$-$C_4$) | 13.5 | 14.0 | 14.0 | 15.2 | 14.2 | 14.6 | 14.5 | 14.2 | 13.2 |
| Gasoline ($C_5$-$C_{12}$) | 33.4 | 28.9 | 26.4 | 33.3 | 30.1 | 28.2 | 32.5 | 29.0 | 27.0 |
| Light Cycle oil ($C_{13}$-$C_{20}$) | 10.2 | 7.9 | 7.4 | 9.4 | 8.3 | 7.7 | 9.0 | 8.4 | 7.5 |
| Heavy Cycle oil ($>C_{20}$) | 36.2 | 42.5 | 45.5 | 36.3 | 41.6 | 43.7 | 38.3 | 42.7 | 46.6 |
| Coke | 6.7 | 6.7 | 6.7 | 5.8 | 5.8 | 5.8 | 5.7 | 5.7 | 5.7 |
| Conversion* | 53.6 | 49.6 | 47.1 | 54.3 | 50.1 | 48.6 | 52.7 | 48.9 | 45.9 |
| Gasoline Selectivity** | 0.62 | 0.58 | 0.56 | 0.61 | 0.60 | 0.58 | 0.62 | 0.59 | 0.59 |

All values are in weight percentage.
The light and heavy cycle oil fractions constitute the unconverted gas oil.
*Conversion = Light gases + Gasoline + Coke.
**Selectivity to Gasoline = wt % Gasoline / wt % Conversion.

TABLE 6

Summary of yields and conversions for the cracking of the synthethic crude SF-164, with FCCT #8 (Super Nova-D impregnated with 2100 ppm Sb, 940 ppm Sn, 3000 ppm Ni and 4500 ppm V).

| | Run # | | | | | | | | |
|---|---|---|---|---|---|---|---|---|---|
| | 69 A | | | 70 A | | | 71 A | | |
| | Conditions | | | | | | | | |
| | 120 ml/min/550° C. | | | 135 ml/min/550° C. | | | 150 ml/min/550° C. | | |
| | Injection # | | | | | | | | |
| | 2 | 6 | 10 | 2 | 6 | 10 | 2 | 6 | 10 |
| Light Gases ($C_1$-$C_4$) | 15.9 | 16.7 | 16.5 | 18.8 | 14.9 | 14.7 | 18.5 | 16.6 | 17.0 |
| Gasoline ($C_5$-$C_{12}$) | 32.4 | 29.1 | 26.9 | 33.7 | 32.2 | 30.2 | 38.2 | 34.6 | 31.5 |
| Light Cycle oil ($C_{13}$-$C_{20}$) | 10.0 | 7.4 | 7.3 | 10.4 | 8.8 | 8.1 | 9.8 | 9.6 | 8.8 |
| Heavy Cycle oil (>$C_{20}$) | 34.3 | 39.4 | 41.9 | 30.6 | 37.6 | 40.5 | 27.1 | 32.8 | 36.3 |
| Coke | 7.4 | 7.4 | 7.4 | 6.5 | 6.5 | 6.5 | 6.4 | 6.4 | 6.4 |
| Conversion* | 55.7 | 53.2 | 50.8 | 59.0 | 53.6 | 51.4 | 63.1 | 57.6 | 54.9 |
| Gasoline Selectivity** | 0.58 | 0.55 | 0.53 | 0.57 | 0.60 | 0.59 | 0.61 | 0.60 | 0.57 |

All values are in weight percentage.
The light and heavy cycle oil fractions constitute the unconverted gas oil.
*Conversion = Light gases + Gasoline + Coke.
**Selectivity to Gasoline = wt % Gasoline / wt % Conversion.

TABLE #7

Summary of yields and conversions for the cracking of the synthethic crude SF-164, with Super Nova-D with 7950 ppm Ni and ppm V.

| | Run # | | | | | | | | |
|---|---|---|---|---|---|---|---|---|---|
| | 4 A | | | 4 B | | | 4 C | | |
| | Conditions | | | | | | | | |
| | 120 ml/min/510° C. | | | 135 ml/min/510° C. | | | 150 ml/min/510° C. | | |
| | Injection # | | | | | | | | |
| | 2 | 6 | 10 | 2 | 6 | 10 | 2 | 6 | 10 |
| Light Gases ($C_1$-$C_4$) | 9.5 | 7.1 | 6.4 | 8.8 | 7.3 | 6.1 | 7.8 | 5.2 | 5.7 |
| Gasoline ($C_5$-$C_{12}$) | 33.5 | 28.2 | 26.5 | 30.8 | 28.9 | 25.3 | 29.4 | 24.4 | 21.9 |
| Light Cycle oil ($C_{13}$-$C_{20}$) | 16.3 | 20.4 | 12.0 | 12.3 | 20.4 | 12.2 | 15.8 | 24.5 | 10.4 |
| Heavy Cycle oil (>$C_{20}$) | 28.6 | 32.2 | 43.0 | 37.5 | 32.8 | 45.8 | 37.8 | 36.7 | 52.8 |
| Coke | 12.1 | 12.1 | 12.1 | 10.6 | 10.6 | 10.6 | 9.2 | 9.2 | 9.2 |
| Conversion* | 55.1 | 47.5 | 45.0 | 50.1 | 46.9 | 42.2 | 46.4 | 38.8 | 36.7 |
| Gasoline Selectivity** | 0.61 | 0.59 | 0.59 | 0.61 | 0.62 | 0.60 | 0.63 | 0.63 | 0.60 |

All values are in weight percentage.
The light and heavy cycle oil fractions constitute the unconverted gas oil.
*Conversion = Light gases + Gasoline + Coke.
**Selectivity to Gasoline = wt % Gasoline / wt % Conversion.

TABLE #8

Summary of yields and conversions for the cracking of the synthethic crude SF-164, with Super Nova-D with 7950 ppm Ni and V..

| | Run # | | | | | | | | |
|---|---|---|---|---|---|---|---|---|---|
| | 8 A | | | 8 B | | | 8 C | | |
| | Conditions | | | | | | | | |
| | 120 ml/min/550° C. | | | 135 ml/min/550° C. | | | 150 ml/min/550° C. | | |
| | Injection # | | | | | | | | |
| | 2 | 6 | 10 | 2 | 6 | 10 | 2 | 6 | 10 |
| Light Gases ($C_1$-$C_4$) | 11.1 | 8.9 | 8.1 | 13.3 | 9.6 | 7.6 | 10.3 | 7.1 | 6.7 |
| Gasoline ($C_5$-$C_{12}$) | 27.7 | 22.3 | 22.1 | 35.5 | 27.5 | 21.6 | 29.3 | 22.7 | 20.8 |
| Light Cycle oil ($C_{13}$-$C_{20}$) | 18.4 | 18.4 | 17.4 | 25.2 | 24.5 | 15.7 | 17.2 | 19.5 | 13.2 |
| Heavy Cycle oil (>$C_{20}$) | 23.6 | 31.2 | 33.2 | 13.0 | 25.4 | 42.1 | 30.8 | 38.3 | 46.9 |
| Coke | 19.2 | 19.2 | 19.2 | 13.0 | 13.0 | 13.0 | 12.4 | 12.4 | 12.4 |
| Conversion* | 58.1 | 50.3 | 49.5 | 61.8 | 50.1 | 42.2 | 52.1 | 42.1 | 39.9 |
| Gasoline | 0.48 | 0.44 | 0.45 | 0.57 | 0.55 | 0.51 | 0.56 | 0.54 | 0.52 |

TABLE #8-continued

Summary of yields and conversions for the cracking of the synthethic crude SF-164, with Super Nova-D with 7950 ppm Ni and V..

| | | | | Run # | | | | |
|---|---|---|---|---|---|---|---|---|
| | 8 A | | | 8 B | | | 8 C | |
| | | | | Conditions | | | | |
| | 120 ml/min/550° C. | | | 135 ml/min/550° C. | | | 150 ml/min/550° C. | |
| | | | | Injection # | | | | |
| | 2 | 6 | 10 | 2 | 6 | 10 | 2 | 6 | 10 |
| Selectivity** | | | | | | | | |

All values are in weight percentage.
The light and heavy cycle oil fractions constitute the unconverted gas oil.
*Conversion = Light gases + Gasoline + Coke.
**Selectivity to Gasoline = wt % Gasoline / wt % Conversion.

The above Tables 3 to 8 show a substantial increase in gasoline yields of up to 39.3% when using the metal traps according to this invention. It was also found that gasoline selectivity obtained with the catalyst of this invention is significantly less affected by increases in temperature than was the case without metal traps.

The Research Octane Number evaluated through gas chromatography (RON) was measured for gasolines obtained in the above procedures and the results obtained are shown in Table 9 below:

TABLE 9

Gasoline Research Octane Number (RON) obtained by catalytic cracking of SF-164 using FCCT #1 (Super Nova D loaded with 2100 ppm Sb, 3000 ppm Ni and 4500 ppm V), FCCT #8 (Super Nova D loaded with 2100 ppm Sb, 940 ppm Sn, 3000 ppm Ni and 4500 ppm V) and FCC #3 (Super Nova D loaded with 7950 ppm of Ni and V)

| Catalyst | 510° C. | 550° C. |
|---|---|---|
| FCCT #1 | 98.71 | 102.00 |
| FCCT #8 | 100.58 | 101.81 |
| FCC #3 | 90.78 | 94.14 |

Standard deviation = 0.72%
Cat/Oil = 4

It can be seen from the above table that an RON increase of up to 10 points was obtained using the catalyst of this invention as compared to a catalyst without metal traps.

The effect on light gas oil formation was also studied and the results obtained are shown in Table 10 below:

TABLE #10

Light Gases Composition (wt %) obtained by catalytic cracking of SF-164 using FCCT #8 (Super Nova D loaded with 2100 ppm Sb, 940 ppm Sn, 3000 ppm Ni and 4500 ppm V) and FCC #3 (Super Nova D loaded with 3000 ppm Ni and 4500 ppm V).

| COMPOUND | FCCT #8 | FCC #3 |
|---|---|---|
| METHANE | 4.8 | 6.9 |
| ETHYLENE | 7.5 | 18.0 |
| ETHANE | 2.1 | 2.6 |
| PROPYLENE | 27.9 | 25.5 |
| PROPANE | 1.6 | 2.4 |
| ISO-BUTANE | 6.5 | 3.0 |
| 1-BUTENE | 28.5 | 23.0 |
| N-BUTANE | 3.1 | 9.3 |
| 2-T-BUTENE | 10.2 | 5.3 |
| 2-C-BUTENE | 7.8 | 4.0 |
| FUEL GASES | 43.9 | 55.4 |
| $C_4$ FRACTION | 56.1 | 44.6 |

An increase of up to 100% in the light gases yield was observed using the catalyst with metal traps according to this invention. This increase in light gases is basically due to the increase in the $C_4$ fraction and a reduction in the fuel gas ($C_1$-$C_3$) yield. Table 10 also shows a substantial reduction in the $C_2$ olefinic fraction and a significant increase in the $C_4$ fraction.

EXAMPLE 2

An important feature of this invention is the $C_4$ olefinic selectivity that is obtained because this fraction is a key one given its potential feedstock value for alkylation in an oil refinery. In order to illustrate the enhanced effect found with the novel catalysts of this invention, a series of tests were carried out in the same manner as described in Example 1 using four different catalysts. These four catalysts were prepared with antimony alone, tin alone, a mixture of tin and antimony and one without metal traps. They were as follows:

FCCT #1 - 2,100 ppm antimony
FCCT #7 - 940 ppm tin
FCCT #8 - 2,100 ppm antimony + 940 ppm tin
FCC #4 - no metal traps The results obtained are shown in FIG. 1.

As observed from FIG. 1 and taking as a reference the $C_4$ yields for contaminated catalyst (3,000 ppm of Ni + 4,500 ppm of V with no metal traps) antimony alone has a detrimental effect on $C_4$ olefinic selectivity while tin has a beneficial effect. By combining both antimony and tin on the same catalyst, a decrease in the $C_4$ selectivity (compared to the case where tin is present alone) should have been expected. In other words, if no enhancement would exist the $C_4$ yields for the catalyst with Sb and Sn should fall somewhat in between the case for Sb and Sn. However, very surprisingly, the $C_4$ olefinic selectivity is actually improved for the catalyst with both antimony and tin. This provides a remarkable enhancement of the $C_4$ fraction.

We claim:

1. A method for making a fluidized cracking catalyst having in situ highly dispersed metal traps which comprises (a) impregnating particles of a zeolite catalyst by the incipient wetness technique under sub-atmospheric conditions with a mixture of a tin compound and an antimony compound dissolved in an organic solvent, (b) stirring the impregnated catalyst in paste form while still under sub-atmospheric conditions, (c) heating the impregnated catalyst in the presence of an oxygen-containing gas until dry, and repeating steps (a), (b) and (c) above until a desired level of said metals forming the metal traps is achieved.

2. A method as claimed in claim 1 wherein the tin compound and antimony compound are mixed together before being added to the zeolite catalyst in a ratio of antimony: tin in the range of 10:1 to about 0.5:1.

3. A method as claimed in claim 2 wherein the ratio of antimony:tin is in the range of 2.2:1 to 1.5:1.

4. A method as claimed in claim 2 wherein the antimony compound is added in an amount of 1000-4000 ppm and the tin compound is added in an amount of 100-4000 ppm.

5. A method as claimed in claim 4 wherein the antimony compound is added in an amount of about 2100 ppm and the tin compound is added in an amount of 940 ppm.

6. A method as claimed in claim 2 wherein the stirred, impregnated catalyst paste is permitted to stand for a time sufficient to minimize concentration gradients before being heated.

7. A method as claimed in claim 6 wherein steps (a), (b), and (c) are repeated at least four times.

8. A method as claimed in claim 2 wherein the impregnation is carried out at a sub-atmospheric pressure in the range of about 200 to about 250 mmHg.

9. A method as claimed in claim 1 wherein the heating is at a temperature in the range of about 425° to about 800° C.

10. A method as claimed in claim 6 wherein the antimony compound is antimony di-n-propylphosphorothioate.

11. A method as claimed in claim 6 wherein the tin compound is tetrabutyltin.

* * * * *